(12) United States Patent
Loce et al.

(10) Patent No.: US 6,816,269 B1
(45) Date of Patent: Nov. 9, 2004

(54) METHOD AND APPARATUS FOR ELECTRONIC REGISTRATION IN A BINARY IMAGE PATH

(75) Inventors: Robert P. Loce, Webster, NY (US); Yeqing Zhang, Penfield, NY (US); Martin E. Banton, Fairport, NY (US); Nancy B. Goodman, Webster, NY (US); Susan J. Zoltner, Pittsford, NY (US); Steve P. Hoover, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 680 days.

(21) Appl. No.: 09/666,706

(22) Filed: Sep. 21, 2000

(51) Int. Cl.$^7$ ............................................. G06F 15/00
(52) U.S. Cl. .................... 358/1.12; 358/1.9; 358/2.1; 358/3.02
(58) Field of Search ..................... 358/1.9, 534, 535, 358/536, 455, 456, 1.12, 3.02, 2.1; 382/162, 167, 294, 300; 347/253, 251

(56) References Cited

U.S. PATENT DOCUMENTS

| | | | |
|---|---|---|---|
| 5,485,289 A | 1/1996 | Curry | 358/2.1 |
| 5,638,110 A | 6/1997 | Curry et al. | 347/253 |
| 5,719,680 A | 2/1998 | Yoshida et al. | |
| 5,732,162 A | 3/1998 | Curry | 382/294 |
| 6,346,993 B1 * | 2/2002 | Curry | 358/1.9 |

* cited by examiner

Primary Examiner—Twyler Lamb
(74) Attorney, Agent, or Firm—Fay, Sharpe, Fagan, Minnich & McKee, LLP (57) ABSTRACT

A registration system for image data in a binary image path includes a registration parameter source, such as a preprogrammed memory or a dynamic device, which provides registration parameters to correct for registration errors from a predetermined reference likely or predicted to occur during image output. A warping processor is in data communication with the registration parameter source which applies a selected registration parameter to an element of the image data resulting in a warped data element, minimizing the effects of the registration error. The system optionally includes an image reducing device which receives groups of high addressable binary image data and converts them to a single pixel. The pixel is then provided to the warping processor. The warping processor applies the selected registration parameter, either static or dynamically selected, from the registration parameter source to the averaged single pixel producing a warped data element. The warped data element is then optionally provided to a tone reproduction curve calibrator which adjusts for darkness errors induced by the warping or displacement of the warped data element. The calibrated pixel is then re-rendered by a processor which processes the calibrated pixel back into a plurality of print-ready data elements. The processor estimates quantization errors induced by the warping of the pixel positioning and disperses that error to following pixels. The print-ready data elements are provided to an image output terminal which produces a physical representation of the original binary image.

20 Claims, 5 Drawing Sheets

METHOD AND APPARATUS FOR ELECTRONIC REGISTRATION IN A BINARY IMAGE PATH

BACKGROUND OF THE INVENTION

This invention generally relates to electronic registration that is implemented by applying image processing to the image data and, more particularly, to a system to improve image registration in a binary image path by electronic compensation of scan line output through a raster output scanner, array exposure device (more generally, array imaging systems) or other like image output terminals.

Electrophotographic marking is a well-known and commonly used method of copying or printing documents. In general, electrophotographic marking employs a charge-retentive, photosensitive surface, known as a photoreceptor, that is initially charged uniformly. In an exposure step, a light image representation of a desired output focused on the photoreceptor discharges specific areas of the surface to create a latent image. In a development step, toner particles are applied to the latent image, forming a toner or developed image. This developed image on the photoreceptor is then transferred to a print sheet on which the desired print or copy is fixed.

The electrophotographic marking process outlined above can be used to produce color as well as black and white (monochrome) images. Generally, color images are produced by repeating the electrophotographic marking process to print two or more different image layers or color image separations in superimposed registration on a single print sheet. This process may be accomplished by using a single exposure device, e.g., a raster output scanner (ROS) or image bar using array optics, where each subsequent image layer is formed on a subsequent pass of the photoreceptor (multiple pass) or by employing multiple exposure devices, each writing a different image layer, during a single revolution of the photoreceptor (single pass) or by employing multiple exposure devices, each writing a different layer on different photoreceptors (often referred to as a tandem architecture). While multiple pass systems require less hardware and are generally easier to implement than single pass systems, single pass systems provide much greater print speeds.

In generating color images, the ability to achieve precise registration of the image layers is necessary to obtain printed image structures that are free of undesirable color fringes and other registration errors. Precise registration of image layers in a single pass machine requires precise registration from one output exposure device, either ROS or array, to the next. One major cause of misregistration in multiple output exposure device systems is the differences in the trajectory and placement of the exposing spots by each exposure device in the imaging system. The following discussion will focus primarily on electrophotographic printing systems using ROS exposure sub-systems, recognizing that any digital printing system based upon multiple color separations will induce similar misregistration errors in output.

In general, a conventional ROS repeatedly scans a data modulated light beam over a photoreceptor surface in accordance with a predetermined raster scanning pattern to generate an image. Typically, a conventional ROS includes a laser diode or similar device to generate a light beam that is modulated in response to received data. The ROS further includes a rotating polygonal mirror block to repeatedly scan the light beam across the photoreceptor. As the photoreceptor is advanced in the process direction, the ROS repeatedly scans the modulated light beam across the surface of the photoreceptor in a fastscan direction that is orthogonal to the process direction. Array based printing systems, on the other hand, typically employ a plurality of imaging sources to illuminate desired portions of the photoreceptor or to apply ink to a substrate whole rows at a time.

To continue the present example, each scan of a ROS beam across the photoreceptor (generally identified for all writing systems herein as a beam scan or simply as a scan) ideally traces a straight line across the surface of the photoreceptor in the process direction. However, in ROS systems, variations in the optics introduce pixel positioning errors from distortions in the trajectory of each beam scan. Typically, each ROS introduces different and independent pixel positioning errors. Thus, in a machine with more than one ROS, each ROS will likely have a different beam scan trajectory. Indeed, there are a multitude of sources of trajectory error, which include pyramidal errors in the polygonal mirror, skew in the alignment of the ROS to the photoreceptor, and the optical aberration known as geometric distortion. Errors can be in either the fastscan or slowscan direction. In an array-based printing system, there are also a multitude of sources of pixel location error, only some of which coincide with those in a ROS. In sum, systems employing multiple color separations presently suffer from image artifacts introduced by pixels of one exposure device being mis-registered from pixels of another exposure device.

To achieve the registration necessary to generate color images that are free of undesirable registration errors, the pixel positioning of each ROS is preferably within ±5 microns of the pixel positioning of every other ROS. More preferably, pixels from each ROS should register precisely with pixels from every other ROS. Such tight registration tolerances are very difficult and very expensive to achieve solely by opto-mechanical means. Systems for compensation and/or correction of beam scan distortions to improve registration errors have been proposed. However, many of these proposed systems correct only one type of distortion and often are themselves complex and expensive to implement.

SUMMARY OF THE INVENTION

In accordance with one aspect of the present invention a received image in a binary image is warped to counter registration errors predicted or expected to occur upon image output.

In accordance with another aspect of the present invention, a method further includes adjusting the warped image representation to compensate for darkness errors associated with a fractional displacement of an output pixel.

In accordance with one embodiment of the present invention, a registration system for image data in a binary image path includes a registration parameter source which provides registration parameters determined to correct for registration errors, or pixel misplacement during image output. The system also includes a warping processor in data communication with the registration parameter source. The warping processor applies a selected registration parameter to an element of the image data which results in a warped data element.

In accordance with another aspect of the present invention, the system further includes an image output element, such as a light emitting diode bar array, ink jet, ion writing device, or other such device known for image writing, in data communication with the rendering processor which receives the plurality of print ready data elements and outputs a physical representation thereof.

In accordance with another aspect of the present invention, the registration system further includes an image reducing device in data communication with the warping processor where the reducing device converts groups of high addressable image data into a single pixel by an operation such as averaging.

In accordance with another embodiment of the present invention, a method for effectively registering a plurality of individually positioned pixels against a predetermined reference, includes warping a pixel stream to correct registration offset from the reference. Typically, the offset is predicted to occur upon image output. The warped pixel stream is then resampled into a selected output ready form.

In accordance with another aspect of the present invention, the method for registering a plurality of individually positioned pixels further includes modulating a light source through a lens corresponding to the resampled output ready form to expose a surface of a photoreceptor.

In accordance with another aspect of the present invention, the resampling step includes estimating a quantization error induced by the warping step in an individual pixel and distributing that error among yet-to-be-processed pixels by halftoning, error diffusion, pattern substitution and the like.

In accordance with another aspect of the present invention, the method further includes adjusting the warped image representation to compensate for darkness errors associated with a fractional displacement of an output pixel.

One advantage of the present invention resides in the ability to electronically register output images in the binary image path.

Another advantage of the present invention resides in the ability to convert one image of a binary image path at a first resolution to an image of a binary image path at a second resolution.

Still further advantages and benefits of the present invention will become apparent to those of ordinary skill in the art upon reading and understanding the following detailed description of the preferred embodiments.

BRIEF DESCRIPTION OF THE DRAWINGS

The invention may take physical form in certain parts and arrangements of parts, and in certain steps and arrangements of steps. The drawings are only for purposes of illustrating the preferred embodiments and are not to be construed as limiting the invention.

DETAILED DESCRIPTION OF THE INVENTION

In describing the present invention, the following terms have been used:

A "beam scan" or "scan" identifies one pass of a modulated light beam output across a photoreceptor. Beam scan is also meant to include a row or column of pixels written by other common writing devices, such as an ink jet head, or ionographic head. The "beam scan trajectory" identifies the trace of a plurality of pixels or illuminations across the surface during a scan.

The present invention is described herein as processing image data in a binary image path. Such a path should be understood to be a system or a portion of a system that receives, processes and outputs (but not necessarily output to hard copy) pixels or image structures possessing particular forms. In a binary image path image, pixels tend to be in a state that could drive a writing device, that is, they may possess binary (on/off) values. They may possess values associated with high addressable image writing (see e.g. "Enhancement and Restoration of Digital Documents," R. Loce, E. Dougherty, SPIE Press, Bellingham Wash., 1997. Page 5), or they may be pulse width and/or amplitude modulated. We intend to include halftone images, line art and text. The halftone images may have been derived from document decomposer or image processing module, or they may have been supplied through a scanning device. Although the invention is intended to overcome difficulties in applying electronic registration to various forms of binary images, some aspects of the present invention also apply to contone image. We intend the present invention to be applied to those uses as well as to halftoned images in gray form, such as a scanned halftone and Adobe Gray Tiling.

The present invention is described herein as compensating for registration errors between a plurality of beam scans illuminating a photoreceptor or a plurality of beam scans illuminating a plurality of photoreceptors. It should be understood that such registration errors include those of a single ROS or multiple ROS's in a system, as well as those of an array or multiple array imaging system and one-dimensional and two-dimensional array imaging systems. Furthermore, it should be understood that compensating for registration errors includes correcting for divergent beam scan trajectories, correcting for beam scan offset in either the fast scan or process direction, or misregistration due to other sources, such as non ideal positioning of the photoreceptor or pixel position errors in an array system. Below, we focus the discussion on beam trajectory distortion, recognizing that various other distortions and displacements from other sources (photoreceptor position in 2 dimensions) may be treated by the present invention in a similar manner.

Figure 1:
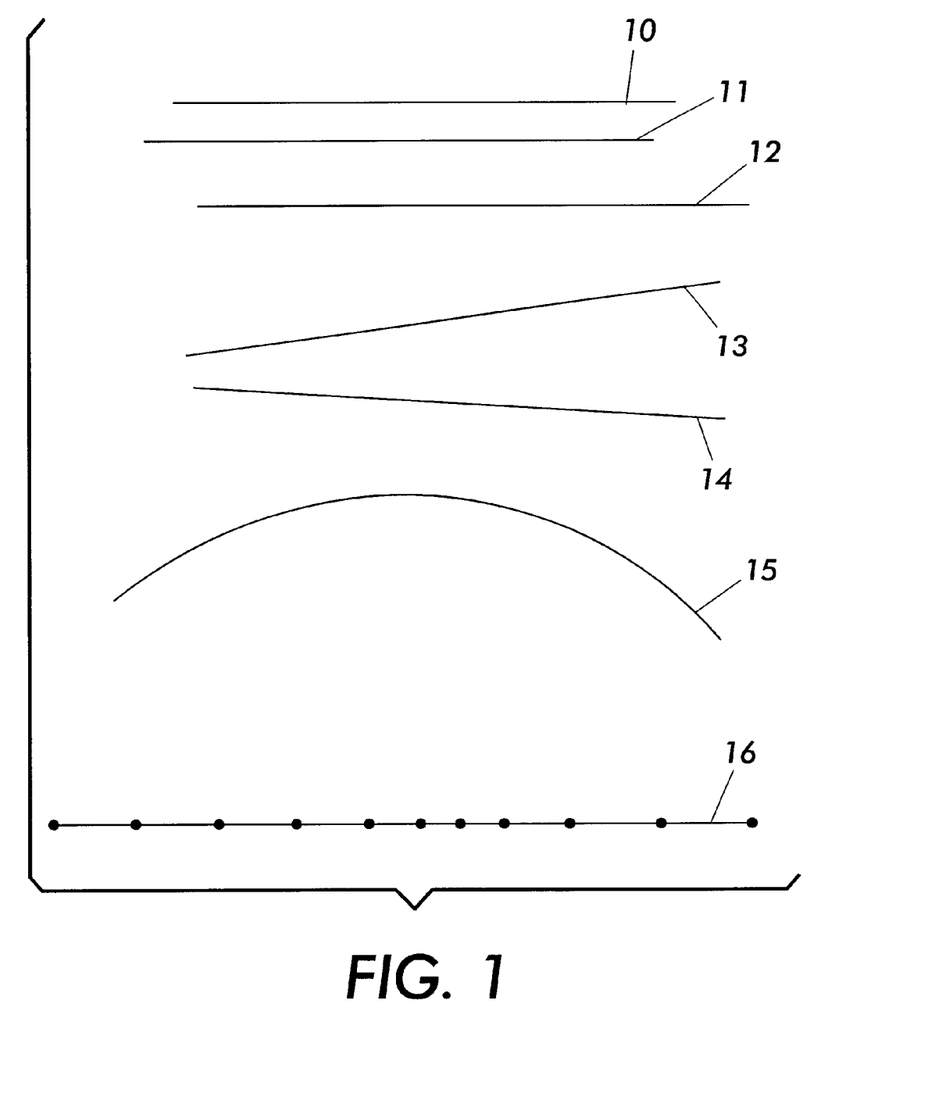
FIG. 1 illustrates four common types of output lens trajectory distortions that can be compensated for by the present invention.

To begin by way of general explanation, four common types of distortions which affect beam scan trajectories are illustrated in FIG. 1. Although the four types of distortions described below are shown separately for illustrative purposes, it is understood that beam scan trajectory can be distorted by any combination of one or more of the four types illustrated in FIG. 1. Each referenced line in FIG. 1 illustrates the trajectory of a beam scan across a photoreceptor in the fastscan (x) direction. Beam scan trajectories 10 –12 illustrate a first type of distortion in which the placement of the beam scans are offset in the fastscan and/or process direction. As can be seen, each of the trajectories 10–12 has a slightly different starting point in the fastscan direction. Similarly, the position of beam scan trajectory 11 is offset in the process (y) direction such that the position of the beam scan is shifted toward beam scan trajectory 10.

A second type of distortion is known as skew. With beam scan skew, some beam scans are generated at a slight angle with respect to other beam scans. Skew can be seen with beam scan trajectories 13 and 14, which are generated at a slight angle with respect to trajectories 10–12 as well as to each other. In a third type of beam scan distortion, referred to as bow, the trajectory of the beam scan is curved as illustrated by trajectory 15. Another type of distortion is non-linearity of the beam scan. With a non-linear beam scan, the distances separating the spots generated by the ROS are not uniform. The squeeze and stretch effect of a non-linear beam scan is illustrated with beam scan trajectory 16 wherein the placement of spots along the beam are squeezed closer in the center of the beam scan and stretched apart at the ends. With array imaging systems in particular, non-uniform element positioning can contribute to non-linear placement of spots across the receptor. A fifth type of distortion, not illustrated in FIG. 1, is intensity variation across the beam scan. With this type of distortion, an exposure system does not have the same output intensity at every point across the receptor. Note that other types of scan line distortion exist and may be treated by the present invention.

As will be more fully discussed below, a method to prevent these distortions from degrading an output image includes warping an image in a binary image path, which at some stage, pixels possess some gray value or continuous variable gray state that describes partial membership in one or more re-positioned pixels; and re-rendering those pixels to a state printable by the imaging subsystem, which is typically binary or high addressable.

Figure 2:
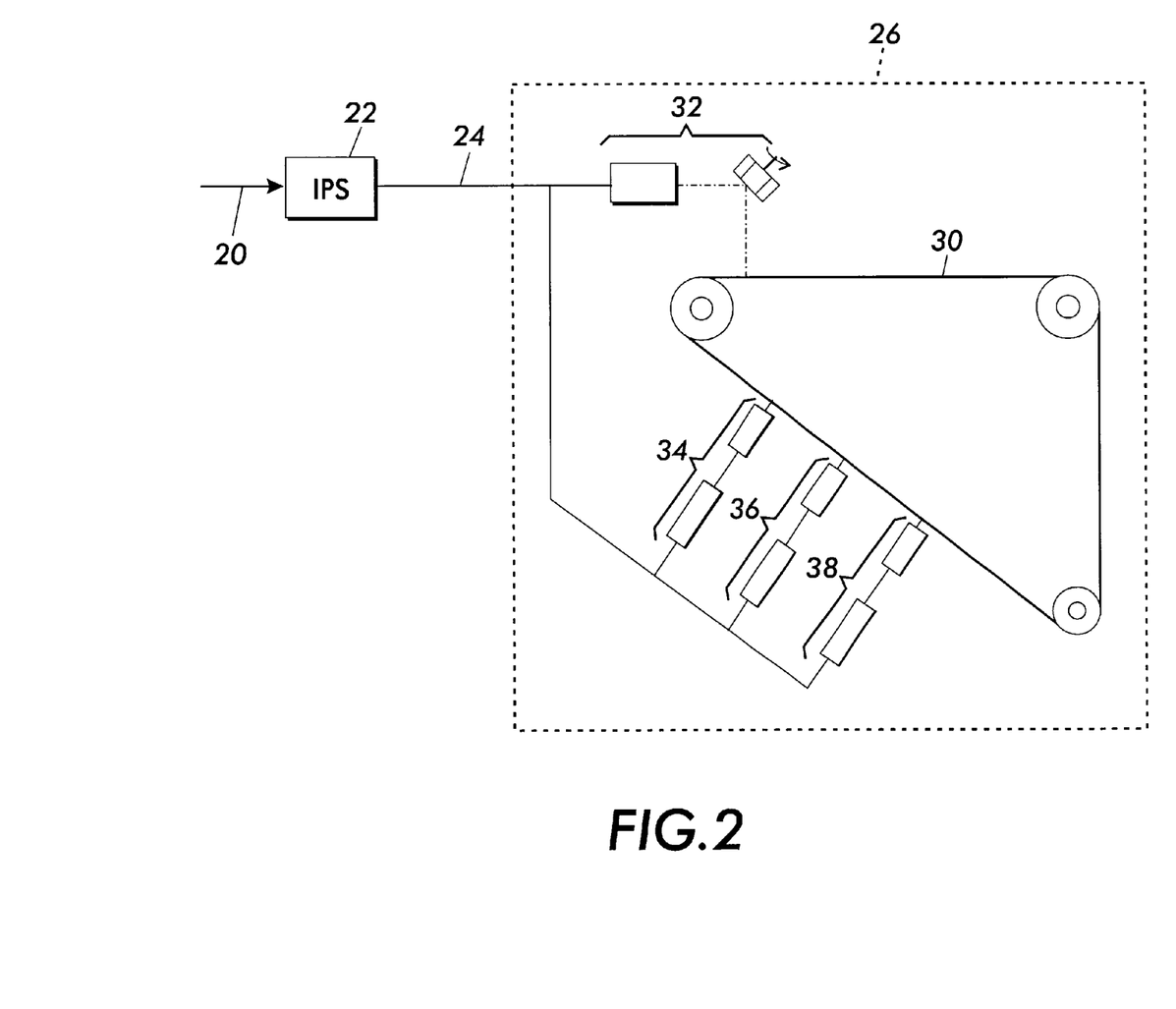
FIG. 2 is a generalized representation of a suitable system level embodiment for one or more aspects of the present invention.

Turning now to FIG. 2, there is shown an embodiment of a digital imaging system that incorporates the features of the present invention. Image data 20 representing an image to be printed is received by an image processing system (IPS) 22 that may incorporate what is known in the art as a digital front end (DFE). IPS 22 processes the received image data 20 to produce print ready binary data 24 that is supplied to a print engine 26. IPS 22 may receive image data 20 from an input scanner, which captures an image from an original document, a computer, a network, or any similar or equivalent image input terminal communicating with IPS 22.

Print engine 26 is beneficially an electrophotographic engine, however, it will become evident from the following discussion that the present invention is useful in a wide variety of digital copying and printing machines and is not limited in its application to the printing machine shown herein. Print engine 26 is illustrated as incorporating a ROS lens system 32 and three array systems 34, 36, 38 for producing color for example. The engine 26, which operates on the print ready binary data from IPS 22 to generate a color document in a single pass, selectively charges a photoreceptive surface in the form of photoreceptor belt 30. Briefly, the uniformly charged photoreceptor 30 is initially exposed to a light image which represents a first color image separation, such as black, at ROS 32. The resulting electrostatic latent image is then developed with black toner particles to produce a black toner image. This same image area with its black toner layer is then recharged, exposed to a light image which represents a second color separation such as yellow at array lens 34, and developed to produce a second color toner layer. This recharge, expose, and develop image on image (REaD IoI) process may be repeated at array lens 36, and array lens 38 to subsequently develop image layers of different colors, such as magenta and cyan.

The present invention is directed towards aspects of IPS 22 depicted in FIG. 2. In particular, inclusion of a warping processor within IPS 22. The warping processor warps image data by realigning or adjusting the pixels therein to compensate for pixel positioning distortions such that color image separations print in register when written with scanners possessing different pixel positioning characteristics. IPS 22 may warp the image data such that each writing device 32–38 appears to have ideal, or at least the same pixel positioning. Alternatively, IPS may warp the image data such that the pixel positioning of one "color" appears to register with the pixel positioning of another. For example, not warping the black image separation provides the advantage of obtaining precise registration of the image separations without generating unwanted artifacts that may arise when warping the black separation. Such artifacts arise because black has high visual contrast and tends to contain a lot of sensitive edge information from text and line art. Also, many black-only pages exist and there typically is not need to compensate for physical distortions in a monochrome image. Those skilled in the art can now appreciate that corrections can be performed so that each image output element delivers ideal output. Alternately, corrections can be applied to a number of the image output elements to match the remaining imager.

Figure 3:
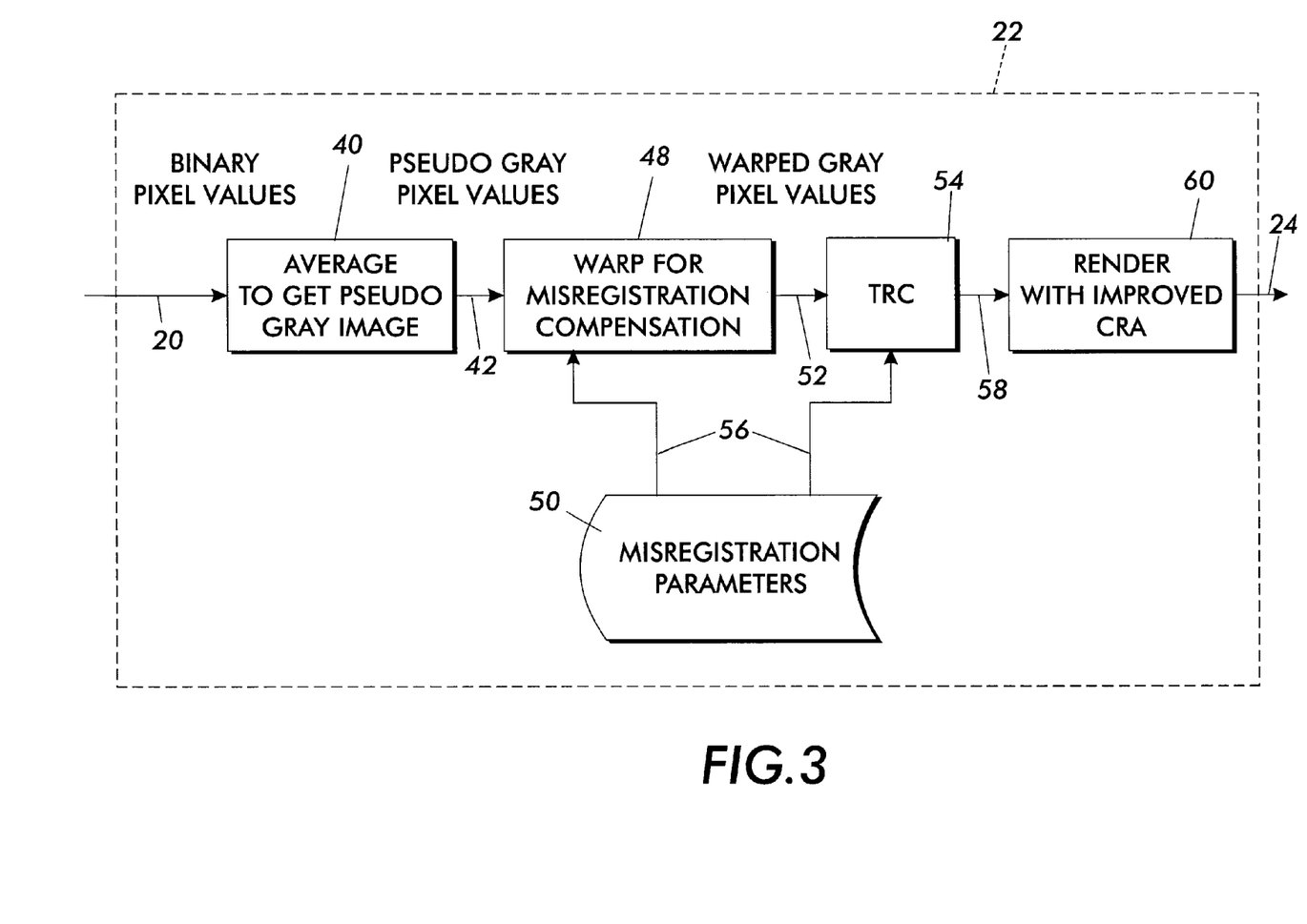
FIG. 3 illustrates a generalized data flow through an image processing system in a binary image path.

Referring now to FIG. 3, there is shown a block diagram illustrating a binary image print path through IPS 22. In particularly, binary image data 20 represents an idealized representation of an image to be printed. Those skilled in the art will appreciate that image data 20 can be received from a printer where a digital front end has rasterized the image to a halftone form, or to a computer application which produces output in halftone form. The image data 20 is received by an image reducing device which converts groups of the high addressable binary image data 20 into single pixels 42. Preferably the image reducing device 40 employs an averaging algorithm to reduce the binary high addressable halftone 20 to a quasi-contone image that possesses the periodic halftone structure. The single quasi-contone image pixel 42 is received by a warping processor 48 which corrects for the registration error expected to be induced by the print engine for the particular pixel by the particular lens system in use. In a simple example, if the exposure system in use is expected to mis-place the pixel +18 microns in the positive process direction, the warping processor will apply a −18 micron correction to the pixel 42. Such registration parameters are provided by a registration parameter source 50. The registration parameter source 50 preferably provides both static and dynamic corrections. The static corrections reside in a memory which is calibrated by static testing and analysis to correct for ROS bow, skew, offset, and the like, and/or array bowing or element spacing and the like (see e.g. FIG. 1). Depending on the memory available for registration parameter storage, the memory may alternately store great detail regarding the registration errors induced by the exposure subsystem or by other subsystems, or alternately may store only selected points across the beam scan permitting interpolation or other intermediate selection techniques in between. Moreover, with known methods to dynamically sense or predict pixel positioning, the invention also corrects for dynamic error due to sources such as photoreceptor positioning. Additionally, the registration parameter source 50 can record and provide dynamically sensed registration errors such as jitter, and/or time, temperature or age errors induced by the array lens. Alternately, these dynamic errors can be corrected by direct processing in the warping processor 48 itself.

The reduction, warping and resampling modules 40, 48, 60 could exist in various forms. They may be implemented separately, as illustrated, or simultaneously in an alternate embodiment. Indeed, the reduction of the high addressable bit groups in a pixel is a preferred method when the warping is in the non high addressable direction (y direction for ROS and x direction for linear arrays), but it is not a mandatory operation. The subsequent module will warp the data. An alternative embodiment is to warp the high addressable data directly without the reduction. One problem with that alternative is that you get a high increase in data rate because each high addressable portion of a pixel will go from 1 bit to typically 8 bits during the interpolation (warping) step, prior to being re-quantized (re-rendered) down to 1 for driving the laser. Another disadvantage of not performing reduction is that the reduction can yield independence to the degree of high addressability. That is, it is desirable to have the module reduce from some high addressability level (depending on the input) to a common level, then re-render to an addressability that optimizes the capability of imaging subsystem.

Another aspect of the present invention includes the ability to directly warp the input data (binary or high addressable) and requantize and resample according to various re-rendering rules. For instance, the amount of warp determines how "gray" the temporary pixel becomes. Effectively, the warped pixel becomes a partial member of two raster lines, because the effect of the warp was to place the value of this pixel between two rasters. The gray level, or membership value, could be rendered to a state usable to the laser writer using common techniques such as halftoning, error diffusion, random switching based on gray-level, or the pattern substitution/error diffusing method stated below as the preferred embodiment.

When a warp is to be applied in a direction of sufficiently high addressability, the interpolation methods can reduce to nearest-neighbor interpolation, which could be implemented by x shifting for a ROS or y shifting for a linear array. For instance, assume that the warp is due to fast scan direction nonlinearity and assume that the laser writer is capable of 8× high addressablity. Placement accuracy to within an ⅛ pixel is usually sufficient for most applications. The image data may be nearest-neighbor interpolated, which is the same as a shift in this case, to the desired position. Warps possessing both x and y components with a laser writer possessing sufficiently high addressability may shift in the direction of the high addressability and perform the gray level operations described above for warping in a non high addressable direction. This can be taken advantage of to its fullest in a system with two different writing units (such as a ROS and an LED bar) whose high addressability directions are perpendicular. In this case, the x shifting can be done by one writing unit and they shifting by the other, each being used to warp the image only in its own direction of high addressability.

Figure 4A:
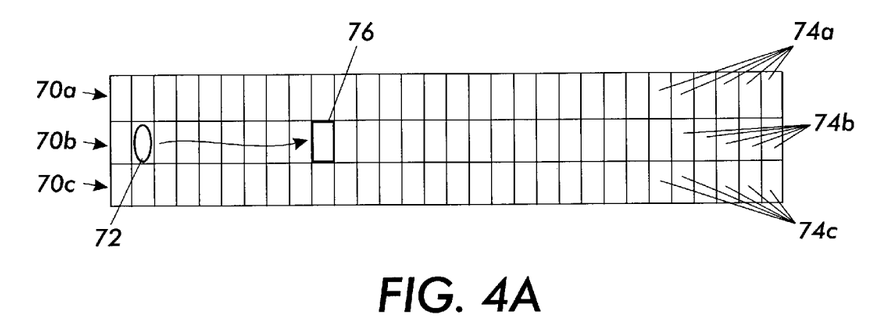
FIGS. 4A and 4B illustrate the warping effect on pixel placement within a halftone dot.
Figure 4B:
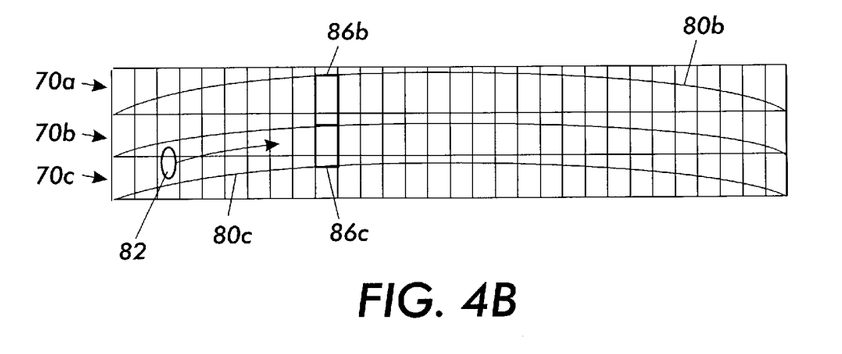

With reference now to FIG. 4A, three idealized raster lines 70a, 70b, 70c are illustrated. A writing or marking spot 72 is illustrated which would preferably be written through the center of pixel lines 70 selectively writing individual pixels 74b. Reference to FIG. 4B shows exemplary non-idealized scan trajectories 80b, 80c superimposed over the idealized raster lines 70. Here, the writing or marking spot 82 travels along the bowed path 80c. It is now apparent that attempting to mark a particular pixel 76 on the idealized raster line 70b creates a situation where the pixels along the bowed trajectory 80b, 80c each have a partial membership in ideal pixel 76. To tightly register pixel positioning it is desirable to produce an effect that represents partially marked pixels 86b, 86c where the need for the effect that represents partial marking is due to the partial membership. The degree of partial membership can be determined by the overlap of the area of the pixel 76 on the ideal trajectory and a pixel with bowed trajectory, 86b and 86c. Other means for calculating partial membership may also be used, such as relative distance between the ideal pixel center and the center of a pixel with bowed trajectory and the like.

Referring back to FIG. 3, following application of the registration parameter, some gray levels and halftone screens may exhibit slight image artifacts such as banding or irregular darkness artifacts. In such cases it is optional but desirable to pass the warped data element 52 through a tone reproduction curve or a family of tone reproduction curves to compensate for the artifact. Selection of the proper correction in the tone reproduction curve 54 is determined by the registration parameter source 50 providing the registration parameter 56 to the TRC 54 in addition to the warping processor 48.

The processed pixel 58 is in effect, a multi-level halftone, where the multiple levels are due to the interpolation of partial membership pixels. The multi-level halftone is then passed to a rendering processor 60 which converts the pixel 58 into a plurality of binary printable data elements. In other words, the rendering processor 60 reconverts the image to the plurality of print ready binary halftone elements 24.

Multi-level halftones can be generated in any of a number of ways known to those skilled in the art. As an example only, multi-level halftoning could be performed using commonly available gray screening software such as is generally available from Adobe. Rendering processor 60 receives multi-bit image data (multi-level halftone) and converts the data into high addressability pixels that produce images having compact dots and sharp edge features when processed by a print engine. With properly treated data, compact rendering processor 60 is able to produce high quality output documents from multi-bit image data having relative few bits per pixel.

Figure 5:
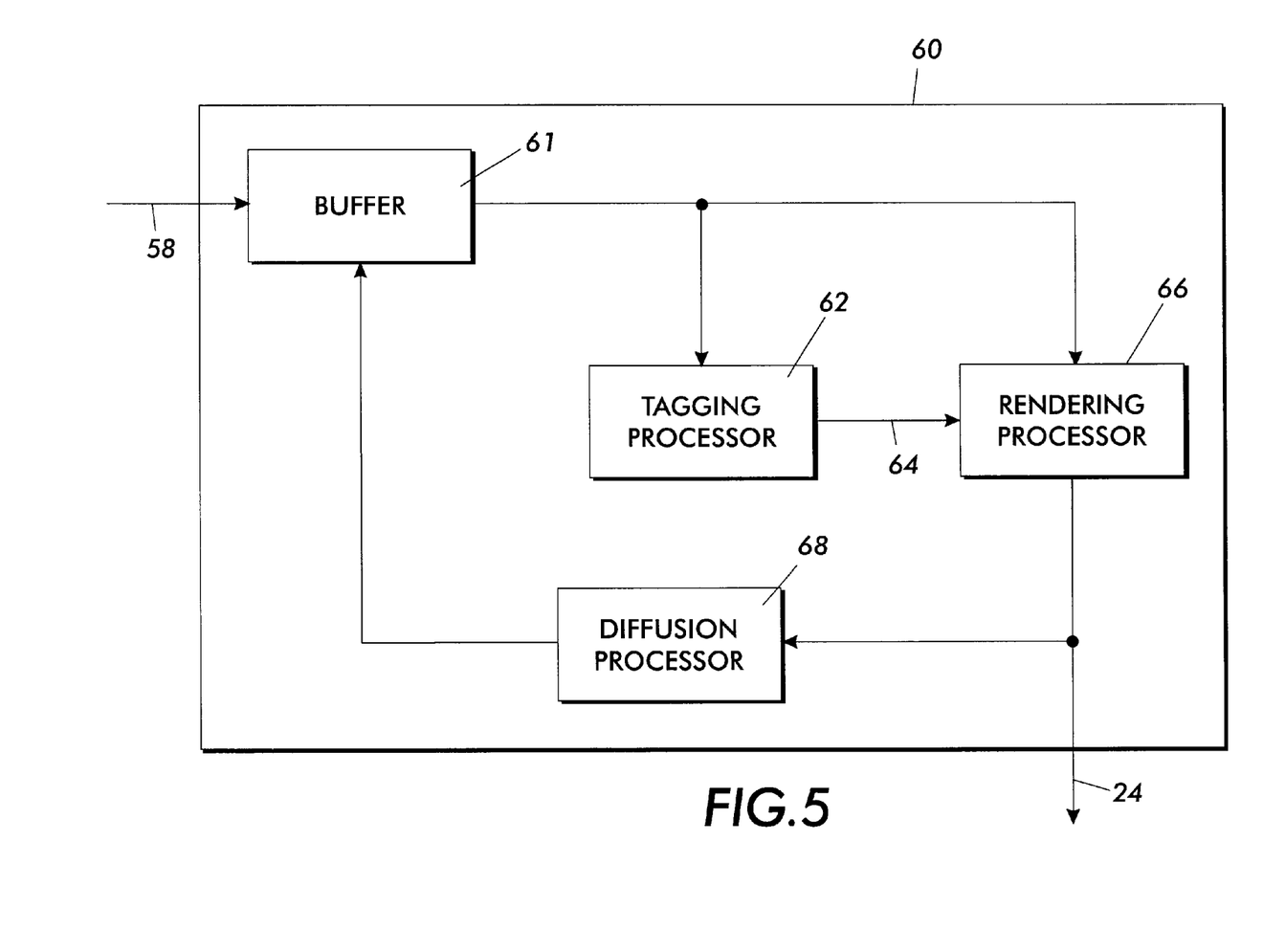
FIG. 5 illustrates a generalized data flow through a compact rendering processor as seen in FIG. 3.

More specifically, and as seen by reference to FIG. 5, processor 60 includes a tagging processor 62, a rendering algorithm 66 and optionally an error diffusion processor 68. The tagging processor 62 analyzes pixel values to identify a fill order that fills high addressability pixel events in a manner to attempt to reproduce an edge. The rendering algorithm 66 generates a high addressability pixel in response to the fill order, making process characteristics and, optionally, a set of rendering states and passes the high addressability pixels to a marking engine in the error diffusion processor 68. The error diffusion processor 68 estimates a quantization error associated with the high addressability pixel and distributes the error over a group of unprocessed pixels. Referring back to FIG. 3, rendering processor 60 preferably employs pattern substitution algorithms according to the arrangement of neighboring pixels and uses error diffusion to pass on any residual error from that substitution. In other words, the rendering processor 60 selects different shapes which exhibit different print or darkness densities depending on neighboring pixels. This shape change is selected to preferably maximize compaction and minimize fragmentation. Those skilled in the art will appreciate that the rendering processor described is exemplary only and that other rendering algorithms can be substituted without departing from the scope of the present invention.

The invention has been described with reference to the preferred embodiments. While the nature of the registration errors will vary among printing technologies, the methods of this invention, by utilizing a general method for correction in the digital image, are understood to be widely applicable to all digital printing systems which rely on the creation and registration of multiple separations or images. Typical examples include any array based imaging system such as LED printbar exposure based electrophotographic printing as well as the traditional scanning printing architectures using ROS exposure elements. In addition to various image writing devices, the present invention applies to various marking technologies beyond xerographic electrophotography, including, for example, ionography, and liquid ink systems and full width ink jet. Obviously other modifications and alterations will occur to others upon a reading and understanding of this specification. The invention is intended to include all such modifications and alterations insofar as they come within the scope of the appended claims or the equivalents thereof.

Having thus described the preferred embodiments, the invention is now claimed to be:

1. A registration system for image data in a binary image path comprising:

an image reducing device which selectively reduces the image data to a quasi-contone state when the image data is binary high addressable data having a periodic halftone structure, the quasi-contone state retaining the periodic halftone structure;

a registration parameter source which provides registration parameters determined to correct for registration errors during image output; and, a warping processor in data communication with the registration parameter source and the image reducing device, the warping processor applying a selected registration parameter to an element of the image data resulting in a warped data element.

2. The registration system as set forth in claim 1, further comprising:

a rendering processor which processes the warped data element into a plurality of print-ready data elements, the rendering processor further including a tagging processor which fills the plurality of print-ready data elements in a manner to attempt to reproduce an edge.

3. The registration system as set forth in claim 2, wherein selected ones of the plurality of print ready data elements have pixel positions corresponding to a beam scan, the rendering processor further comprising:

an error diffuser which estimates a quantization error and disperses the error over unprocessed pixels along the beam scan.

4. The registration system as set forth in claim 2, further comprising:

an image output element in data communication with the rendering processor, the image output element receiving the plurality of print-ready data elements and outputting a physical representation thereof.

5. The registration system as set forth in claim 4, where the image output element is selected from the set of a raster output scanner, a light emitting diode bar array an ink jet array and an ionographic arrays.

6. The registration system as set forth in claim 2, where the print ready data elements comprise selected portions of pixels in a scan line.

7. The registration system as set forth in claim 1, wherein the image reducing device converts groups of the high addressable binary image data into a single pixel.

8. The registration system as set forth in claim 1, further comprising:

a tone reproduction curve calibrator in data communication with the warping processor, the calibrator adjusting for a darkness error depending on the registration parameter selected.

9. A method of positioning output pixels in a xerographic device comprising:

receiving a plurality of input data elements;

selectively replacing the plurality of input data elements with a reduced plurality of quasi-contone input data elements when the plurality of input data elements comprise binary high addressable data having a periodic halftone structure, the reduced plurality of quasi-contone input data elements retaining the periodic halftone structure;

selecting at least one registration parameter to adjust positioning;

applying the at least one parameter to each of the plurality of input data elements; and, rendering each of the plurality of input data elements with the applied at least one parameter resulting in a plurality of output data elements, each positioned in apparent alignment with other output data elements.

10. The method of positioning output pixels as set forth in claim 9, wherein the selecting step comprises:

accessing stored registration parameters to compensate for misplacements of each of the plurality of output data elements by an output mechanism; and, selecting at least one of the stored registration parameters to apply to each of the plurality of input data elements.

11. The method of positioning output pixels as set forth in claim 9, wherein the selecting step comprises:

determining at least one registration parameter to compensate for dynamic factors in an output mechanism.

12. The method of positioning output pixels as set forth in claim 9, further comprising:

adjusting each data element with the at least one applied parameter for intensity errors induced by the rendering step.

13. The method of positioning output pixels as set forth in claim 9, further comprising:

adjusting each data element with the at least one applied parameter for intensity errors induced by the applying step.

14. A method for effectively registering a plurality of individually positioned pixels against a predetermined reference, the method comprising:

selectively replacing an input pixel stream with a reduced pixel stream having a reduced number of quasi-contone pixels when the input pixel stream comprises binary high addressable data having a periodic halftone structure, the reduced pixel stream retaining the periodic halftone structure;

warping a pixel stream to correct registration offset from the reference predicted to occur upon image output; and, resampling the warped pixel stream into a selected output ready form.

15. The method for effectively registering a plurality of individually positioned pixels as set forth in claim 14, wherein the resampling step comprises:

estimating a quantization error induced by the warping step in an individual pixel; and distributing the quantization error among following pixels.

16. The method for effectively registering a plurality of individually positioned pixels as set forth in claim 14, where the predetermined reference includes a beam scan trajectory, and the warping step comprises:

determining a registration parameter to adjust a pixel position with respect to the beam scan trajectory; and, applying the registration parameter to the pixel.

17. The method for effectively registering a plurality of individually positioned pixels as set forth in claim 14, further comprising:

averaging groups of high addressable input pixels to form a single pixel.

18. The method for effectively registering a plurality of individually positioned pixels as set forth in claim 16, further comprising:

adjusting the warped pixel stream to compensate for darkness errors associated with fractional displacements of individual output pixels.

19. The method for effectively registering a plurality of individually positioned pixels as set forth in claim 18, wherein the adjusting step comprises selecting a darkness correction from a table based on the registration parameter selected.

20. The method for effectively registering a plurality of individually positioned pixels as set forth in claim 14, wherein the resampling step comprises:

filling the output ready form from the warped pixel stream in a manner to attempt to reproduce an edge.

* * * * *